US005208448A

United States Patent [19]

Everett

[11] Patent Number: 5,208,448

[45] Date of Patent: May 4, 1993

[54] PLASMA TORCH NOZZLE WITH IMPROVED COOLING GAS FLOW

[75] Inventor: Jeffrey S. Everett, Florence, S.C.

[73] Assignee: ESAB Welding Products, Inc., Florence, S.C.

[21] Appl. No.: 863,215

[22] Filed: Apr. 3, 1992

[51] Int. Cl.[5] .......... B23K 9/00

[52] U.S. Cl. .......... 219/121.5; 219/121.480; 219/75; 219/121.390

[58] Field of Search .......... 219/121.5, 121.51, 74, 219/75, 121.48, 76.16

[56] References Cited

U.S. PATENT DOCUMENTS

| | | |
|---|---|---|
| 2,052,869 | 9/1936 | Coanda . |
| 4,311,897 | 1/1982 | Yerushalmy . |
| 4,469,932 | 9/1984 | Spiegelberg et al. . |
| 4,650,953 | 3/1987 | Eger et al. . |
| 4,716,269 | 12/1987 | Carkhuff . |
| 4,748,312 | 5/1988 | Hatch et al. . |
| 4,762,977 | 8/1988 | Browning . |
| 4,777,343 | 10/1988 | Goodwin . |
| 4,902,871 | 2/1990 | Sanders et al. . |
| 5,013,885 | 5/1991 | Carkhuff et al. . |

*Primary Examiner*—Mark H. Paschall

*Attorney, Agent, or Firm*—Bell, Seltzer, Park & Gibson

[57] ABSTRACT

An improved plasma torch nozzle which has a substantially barrel shaped body having a longitudinal opening therethrough for directing the flow of gas for a plasma arc from rearward portions of the body downstream to forward portions of the body and then out of a face at the forward portions to form a plasma arc in the presence of a sufficient electrical potential difference. The nozzle body particularly comprises a rear section for which the outer surface portions diverge with respect to the downstream direction, a center section for which the outer surface portions are cylindrical with respect to the downstream direction, and a forward section for which the outer surface portions converge with respect to the downstream direction so that the respective outer surface portions form a continuous outer surface for the nozzle body that encourages the flow of gases that is directed along the outer surface of the nozzle body to follow the outer surface and converge at the face of the nozzle body.

20 Claims, 2 Drawing Sheets

PLASMA TORCH NOZZLE WITH IMPROVED COOLING GAS FLOW

FIELD OF THE INVENTION

The present invention relates to plasma arc torches, and in particular relates to an improved nozzle for a plasma arc torch.

BACKGROUND OF THE INVENTION

Plasma arc cutting is a metal working technique in which the heat required to sever, cut, or otherwise perform similar tasks on metals is provided by a plasma; i.e. a state in which matter has been heated to an extent and under other appropriate conditions for all of the elements to be present in ionized or atomic form. In most circumstances, the most efficient way to initiate and generate a plasma is to apply a sufficient potential difference (voltage drop) between an anode and a cathode in the presence of the plasma-forming material, typically a flowing gas. In one form of plasma arc welding known as transferred arc, the potential difference is applied between an electrode in the torch and a metal workpiece itself.

A plasma arc torch cutting system has a number of different applications, one of which is cutting. Cutting is sometimes initiated at the edge of a workpiece, but under other circumstances is started at some portion of the workpiece sufficiently displaced from an edge so that the edge does not come into account during the initial cutting. When a plasma arc torch is used to initiate an opening or a cut at such a position other than the edge, the technique is referred to as "piercing". Piercing raises a particular problem with plasma arc torches in that because of the location at which it takes place, there exists no edge or bottom opening (at least initially) into which molten metal can travel. Thus, in one typical side effect of piercing, molten metal in the cut tends to splash up against and damage the torch and its nozzle.

As known to those familiar with plasma arc welding and cutting torches, quite often the effect of damage to the nozzle will be reflected in damage to the electrode, and occasionally catastrophic damage to the entire plasma arc torch. Therefore, to the extent that the splash-back from piercing or other operations can be minimized or eliminated, the expected lifetime of the plasma arc torch can be extended.

OBJECT AND SUMMARY OF THE INVENTION

Therefore, it is an object of the present invention to provide a plasma arc torch that includes a greater protection against splash-back than conventional torches, and which has other advantages, particularly with respect to cooling properties.

The invention meets this object with an improved plasma torch nozzle. The nozzle has a substantially barrel shaped body with a longitudinal opening therethrough for directing the flow of gas for a plasma arc from rearward portions of the body downstream to forward portions of the body and then out of an orifice at the forward portion to form a plasma arc in the presence of a sufficient electrical potential difference. The nozzle body particularly comprises a rear section for which the outer surface portions diverge with respect to the downstream direction, a center section for which the outer surface portions are cylindrical with respect to the downstream direction, and a forward section for which the outer surface portions converge with respect to the downstream direction. The respective outer surface portions form a continuous outer surface for the nozzle body that encourages the flow of gases that is directed along the outer surface of the nozzle body to follow the outer surface and converge at the nozzle face. The converging action of gas at the nozzle face helps protect the nozzle from splash-back during cutting, and particularly during piercing.

The foregoing and other objects, advantages and features of the invention, and the manner in which the same are accomplished, will become more readily apparent upon consideration of the following detailed description of the invention taken in conjunction with the accompanying drawings, which illustrate preferred and exemplary embodiments, and wherein:

DETAILED DESCRIPTION

Figure 1:
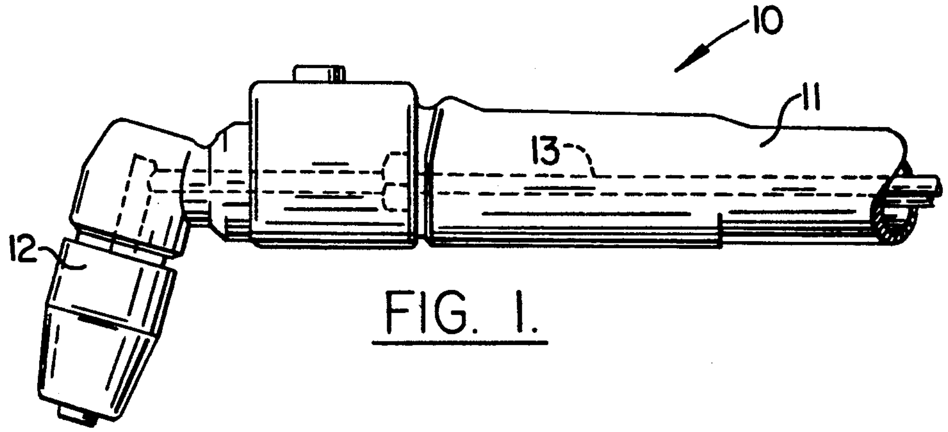
FIG. 1 is a side elevational view of a plasma arc torch.

FIG. 1 is an overall side elevational illustration of a plasma arc torch broadly designated at 10. The general construction and operation of the main portions of such a torch are well known in the art and will not be otherwise described in detail except to note that the torch includes a main body portion 11 and an overall nozzle portion 12, which in the illustrated embodiment is positioned at an angle with respect to the body 11. Those familiar with such torches know that the overall nozzle portion 12 can also be arranged in line with the body portion 11 to form a pencil type arrangement common in this art.

The torch 10 also includes one or more passages indicated at 13 through which the plasma arc gas can travel from a supply (not shown) to the overall nozzle portion 12. As is further known to those familiar with plasma arc welding, typically one or more gases will be used for both forming the plasma arc, and for being directed in a cooling stream throughout the interior and exterior of the tip portion 12 to help moderate the effects of the high temperatures of the plasma on the working parts of the torch.

Figure 2:
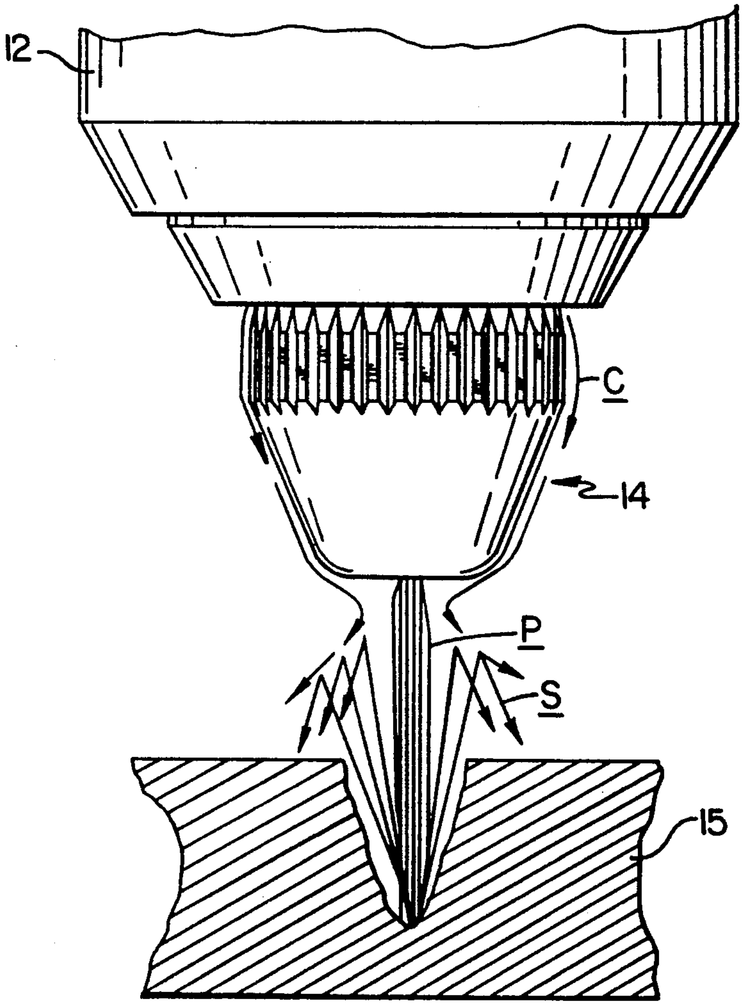
FIG. 2 is an enlarged side elevational view of the nozzle and portions of a torch schematically illustrating a cutting or piercing operation.

FIG. 2 is an enlarged view of a lower portion of a plasma arc torch extending from the overall nozzle portion 12 illustrated in FIG. 1. FIG. 2 shows one embodiment of the nozzle of the present invention broadly designated at 14. The illustrated embodiment is that of a transferred arc plasma in which a workpiece 15 is used in conjunction with the electrode of the torch to establish a potential difference and the plasma arc.

FIG. 2 also illustrates in schematic fashion the plasma P, the splash-back S from the workpiece, and the flow of cooling gases C around the nozzle 14 which serve to both cool the nozzle and prevent splash-back from damaging the nozzle in a manner to be described herein.

Figure 3:
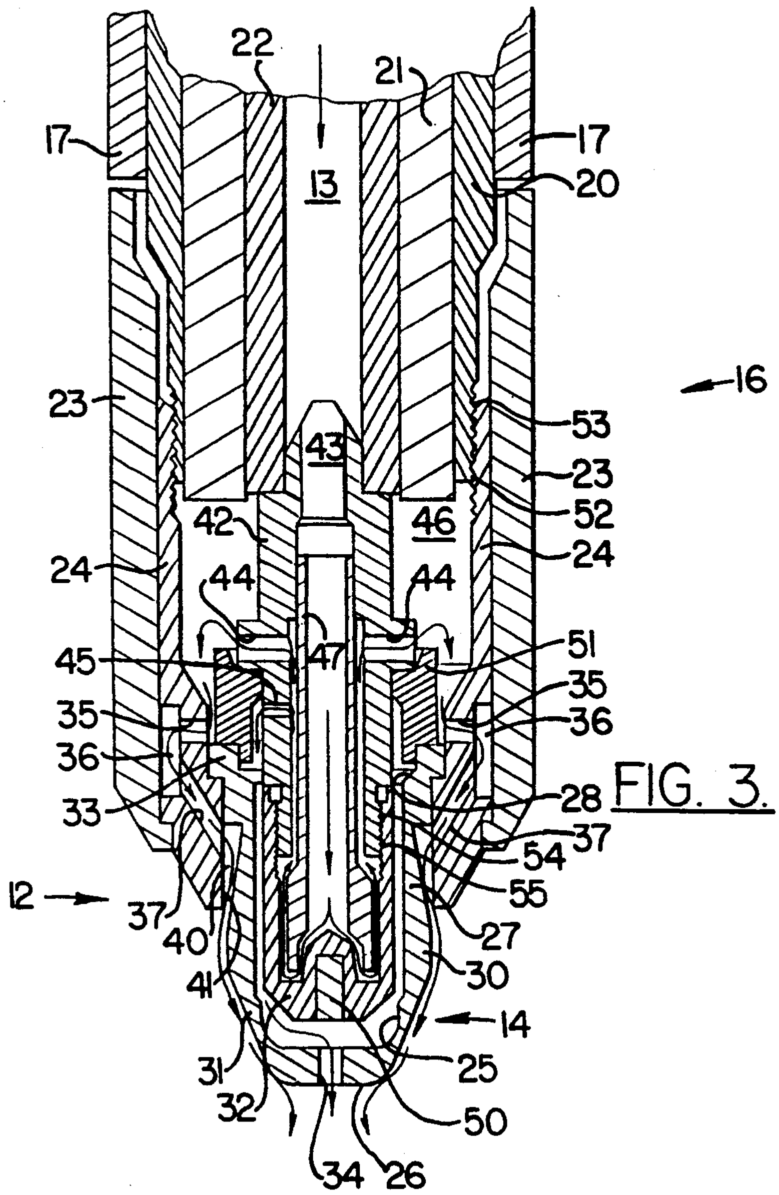
FIG. 3 is a cross-sectional view of a number of the operational portions of a plasma arc torch.

FIG. 3 is a cross-sectional view of a torch broadly designated at 16 and showing a number of details of its structure and operation in accordance with the present invention. Consistent with FIG. 1, the torch includes an overall nozzle portion broadly designated at 12, the gas passageway 13 and the nozzle itself broadly designated at 14.

By way of background, the other portions of the torch include an outer insulator 17, a pilot arc body 20, an inner insulator 21 and an electrode body 22. These are generally cylindrical parts, and in the cross-sectional view of FIG. 3 they appear as somewhat identical mirror image portions on opposite sides of the central gas passage 13. As further used herein, the term "body" refers to main portions of the torch above the nozzle; i.e. electrode body 22 or pilot arc body 20. The embodiment of FIG. 3 further includes a retaining member insulator 23 and a retaining member 24.

The nozzle 14 has a substantially barrel shaped body with a longitudinal opening 25 therethrough for directing the flow of a gas for a plasma arc from rearward portions of the body downstream to forward portions and the out of a nozzle face 26 at the forward portions to form a plasma arc in the presence of an appropriate electrical potential difference. The nozzle 14 further comprises a rear section 27 (also illustrated in FIGS. 4 and 5) for which the outer surface portions diverge with respect to the downstream direction. As used herein, "downstream" refers to the overall direction of gas flow in the touch and its nozzle in normal operation.

The nozzle 14 also includes a center section 30 for which the outer surface portions are substantially cylindrical with respect to the downstream direction, and a forward section 31 for which the outer surface portions converge with respect to the downstream direction, and wherein the respective outer surface portions form a continuous outer surface for the nozzle body and for encouraging the flow of gases directed along the outer surface of the nozzle body to follow the outer surface and converge at the face 26 of the nozzle body.

In this regard, the shape of the nozzle 14 takes advantage of a fluid flow phenomenon known as the Coanda effect, also referred to as the wall attachment effect. The Coanda effect is the tendency of a flowing fluid to follow a surface against which the fluid is flowing even as the surface changes direction. In particular, if the change in the surface against which the fluid is flowing is moderate, a pressure gradient will be created at the points where the surface changes direction, and this pressure gradient tends to hold the flowing fluid against the surface. It will thus be seen from the illustrations of FIGS. 3, 4 and 5, that the surface profile of the nozzle 14 of the present invention creates, in the presence of a gas flowing over it, a converging flow of cooling gas C on the exterior of the nozzle 14 which helps deflect splash-back during torch operation as illustrated in FIG. 2.

In the illustrated embodiment, the plasma torch nozzle 14 has a substantially hollow body with a mouth 28 behind the rear portion 27. The mouth 28 receives a torch electrode illustrated at 32 therethrough for positioning the tip of the torch electrode 32 adjacent the nozzle face 26 so that an appropriate plasma arc can be formed between the electrode and the nozzle or between the electrode and a conductive workpiece. The particular spacing between the electrode 32 and the nozzle 14 is a function of gas composition and flow, and of the particular voltage drop desired or needed. These parameters are well known to those of skill in this art, and can be evaluated and selected without undue experimentation.

Figure 4:
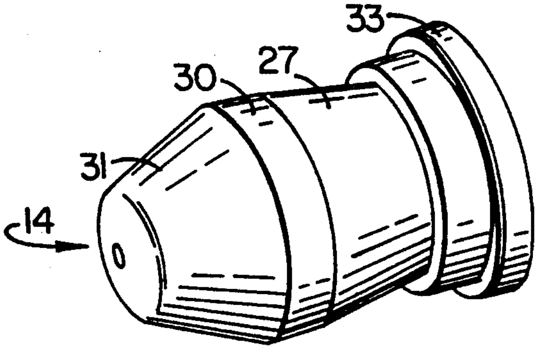
FIG. 4 is a perspective view of a nozzle body according to the present invention.
Figure 5:
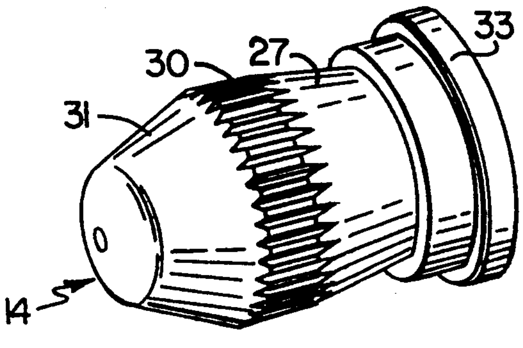
FIG. 5 is a perspective view of a second embodiment of a nozzle body according to the present invention.

In the illustrated embodiment the plasma torch nozzle 14 further comprises at least one annular shoulder 33 for being received upon and supported by the retaining member 24 (FIGS. 3, 4 and 5).

In preferred embodiments, the diverging outer surface portions of the rear section 27 diverge at an angle of between about 1° and 20° from the longitudinal center axis of the barrel shaped nozzle 14. The converging outer surface portions of the forward section 31 converge at an angle of between 5° and 20° from the longitudinal center axis of the barrel shaped nozzle body 14.

The face 26 of the nozzle further comprises a circular orifice 34 again centered along the longitudinal axis of the barrel shaped body. As illustrated in FIGS. 4 and 5, in alternative embodiments, the outer surface portion of the center section 30 can either be smooth, or have a textured surface shown as knurling.

As further illustrated in FIG. 3, the retaining member 24 has upper portions which are in threaded engagement with the pilot arc body 20, and the retaining member 24 likewise engages the shoulder 33 of the nozzle 14 to hold it in place when the retaining member is held in place. It will be understood that in other embodiments the nozzle could include a threaded portion and be threaded in place. The retaining member 24 further comprises means for directing a flow of cooling gases against the outer surface of the nozzle 14. These are shown as a first set of exit holes 35 which open into a plenum 36 formed between the retaining member 24 and the surrounding retaining member insulator 23. From the plenum 36, cooling gas flows through a second set of exit holes 37 which open adjacent the nozzle body 14. As illustrated in FIG. 3, the retaining member 24 positions the nozzle 14 with the rear section diverging portions 27 adjacent the second set of openings 37. In this arrangement, the retaining member 24 and the rearward portions of the nozzle 14 define a second plenum 40 therebetween in which the flow of cooling gas C can equilibrate as it begins to flow downstream along the nozzle body.

FIG. 3 also illustrates that the retaining member 24 includes a generally circular opening 41 through which the nozzle body 14 projects, and wherein the retaining member 24 and the nozzle body 14 define an annulus therebetween through which cooling gas c can flow. In the illustrated embodiment, the retaining member 24 positions the nozzle body 14 with at least the center portion 30 and the forward portion 31 substantially entirely outside of the retaining member. As a result, the flow of cooling gas along the outer surface of the nozzle 14 takes place substantially outside of the remainder of the plasma torch assembly 16 to thereby more efficiently cool the nozzle 14. In preferred embodiments, the annulus between the retaining member 24 and the nozzle 14 has a width of between about 0.005 and 0.030 inches.

FIG. 3 also illustrates some of the remaining features of the torch and the manner in which gas flows through it. First, as already described, the gas flow enters the lower portions of the torch 16 through the gas passage 13 which extends longitudinally through the electrode body 22. The electrode 32 is substantially hollow and in fluid communication with the longitudinal gas passage 13 in the electrode body 22 so that a gas directed through the electrode body 22 will reach the interior of the electrode 32 and help cool the electrode 32 during plasma arc operation. The electrode body 22 further comprises means illustrated as the electrode adapter 42 for directing a fluid from the interior of the electrode to both the interior and exterior of the nozzle 14 so that a gas flow directed to the interior of the nozzle 14 forms a plasma arc in the presence of a sufficient electrical potential difference and a gas flow directed to the exterior of the nozzle 14 helps cool the nozzle 14 and helps divert splash-back from a workpiece as the gas flow travels over the diverging and converging outer surface of the nozzle 14.

In this regard, the diverging and converging shape of the nozzle 14 can be advantageously used to reduce the mass of the nozzle 14, which in turn reduces its heat retention and makes it easier to cool.

The electrode adapter 42 is carried by the electrode body 22 and comprises a generally cylindrical body with a longitudinal opening 43 extending entirely therethrough. The cylindrical body has a first set of radially spaced openings 44 perpendicular to, and in fluid communication with, the longitudinal opening 43 for providing fluid communication between the interior of the electrode 32 and the exterior of the nozzle 14. The electrode adapter 42 further comprises a second set of radially spaced openings 45 that are also in fluid communication with the longitudinal opening 43 for providing fluid communication between the interior of the electrode 32 and the interior of the nozzle 14. The electrode adapter 42 is preferably replaceable as set forth by Carkhuff in co-pending application Ser. No. 07/862,785 filed concurrently herewith for "Electrode Adapter", of which are incorporated entirely herein by reference. As set forth therein, the replaceable electrode adapter protects the electrode body and related portions of the torch from catastrophic failure of the electrode.

As thus illustrated in FIG. 3, it will be seen that the electrode adapter 42 and the retaining member 24 define a chamber 46 between them. Thus, in operation gas flows through the gas passage 13 and into the longitudinal opening 43 in the adapter 42. The gas travels along the interior of the adapter 42 and along the interior of a concentrically placed cooling baffle 47 until it reaches the interior of the electrode 32. From the interior of the electrode 32 the gas flows upwardly in the adapter, between the longitudinal opening 43 and the cooling baffle 47, until it exits either at the first perpendicular openings 44 or second perpendicular openings 45. The gas which exits from the first openings 44 exits into chamber 46, and then through exit holes 35, plenum 36, exit holes 37, plenum 40 and the annulus between the nozzle 14 and the retaining member 24 to cool the nozzle, taking advantage of the Coanda effect as described earlier. Other portions of the gas from the interior of electrode 32 exit from the second set of exit holes 45 which direct the gas into the space between the electrode 32 and the interior of the nozzle 14 and then out of the nozzle orifice 34. When a sufficient electrical potential difference (voltage drop) is applied between the electrode 32 and the workpiece, a plasma arc will be created between the electrode and the workpiece in the gases flowing through the orifice 34. As is common in this art, an electrode insert 50 is also used to help propagate the voltage drop in the plasma.

The nozzle design of the present invention was tested in a piercing text and compared to ESAB's current production PT-20M nozzle (The ESAB Group, P.O. Box F-6000, Ebenezer Road, Florence, S.C. 29501). The torch was placed over a 1" thick carbon steel plate, with a nozzle-to-work distance set at ¼". The air supply pressure for cooling and plasma gas was set at 85 PSIG.

Using a 100 A arc current, the torch was turned on for specific time periods. These time periods were progressively increased until the torch totally pierced the plate, thus indicating the minimum time required for a total pierce. The splash-back of molten metal on each nozzle after ten (10) successive pierces was also noted.

Under these test conditions, the minimum pierce time for the PT-20M nozzle was 3.75 seconds, with splash-back accumulating rapidly on the nozzle face in successive pierce testing. Using the present invention, however, the minimum pierce time was reduced to 2.75 seconds, and splash-back on the nozzle face was almost nonexistent. Although the inventor does not wish to be bound by any particular theory, the reduction of splash-back appears to be the result of better cooling of the nozzle. As a result, any splash-back that did hit the nozzle appeared to cool rapidly and flake off rather than sticking to the face. Additionally, the spray pattern of the molten material ejected from the pierce appeared to be deflected in a more horizontal direction and thus away from the torch.

FIG. 3 illustrates a few other details which are familiar to those of ordinary skill in this art. These include the electrode insulator 51, the threads 52 on the retaining member 24 and the corresponding threads 53 on the pilot arc body 20 for fastening the retaining member 24 to the pilot arc body 20. Additionally, the electrode adapter 43 and the electrode 32 are threaded to each other in the preferred embodiment using respective threads 54 and 55.

In the drawings and specification, there have been disclosed typical preferred embodiments of the invention, and although specific terms have been employed, they have been used in a generic and descriptive sense only and not for purposes of limitation, the scope of the invention being set forth in the following claims.

That which is claimed is:

1. An improved plasma torch nozzle comprising:

a substantially barrel-shaped nozzle body having a longitudinal opening therethrough for directing the flow of a gas for a plasma arc from rearward portions of said body downstream to forward portions of said body, and then out of a face at said forward portions to form a plasma arc in the presence of a sufficient electrical potential difference;

said nozzle body further comprising a rear section for which the outer surface portions diverge with respect to the downstream direction, a center section for which the outer surface portions are substantially cylindrical with respect to the downstream direction, and a forward section for which the outer surface portions converge with respect to the downstream direction so that said outer surface of said nozzle body changes direction at said forward section for creating a pressure gradient where said center section meets said forward section when a gas flows from said center section to said forward section in which the pressure gradient tends to hold the gas along said outer surface as it flows, and so that the gas converges at said face of said nozzle body.

2. A plasma torch nozzle according to claim 1 wherein said nozzle body is substantially hollow with a mouth at said rear portion for receiving a torch electrode therethrough and for positioning the tip of a torch electrode adjacent said nozzle face so that an appropriate plasma arc can be formed between said electrode and said nozzle or between said electrode and a conductive workpiece.

3. A plasma torch nozzle according to claim 2 wherein said rear portion further comprises at least one annular shoulder for being received upon and supported by a retaining member in a plasma arc torch.

4. A plasma torch nozzle according to claim 1 wherein said diverging outer surface portions of said rear section diverge at an angle of between about 1 and 20 degrees from the longitudinal center axis of said barrel shaped nozzle body.

5. A plasma torch nozzle according to claim 1 wherein said converging outer surface portions of said forward section converge at an angle of between about 5 and 20 degrees from the longitudinal center axis of said barrel shaped nozzle body.

6. A plasma torch nozzle according to claim 1 wherein said face comprises a circular orifice centered along the longitudinal axis of said barrel-shaped nozzle body.

7. A plasma torch nozzle according to claim 1 wherein said outer surface portion of said center section has a knurled surface for enhancing heat transfer and improving the cooling action of the nozzle.

8. An improved plasma torch assembly comprising:

a nozzle and a retaining member;

said nozzle comprising a substantially barrel-shaped nozzle body having a longitudinal opening therethrough for directing the flow of a gas for a plasma arc from rearward portions of said body downstream to forward portions of said body, and then out of said forward portions to form a plasma arc in the presence of a sufficient electrical potential difference; said nozzle body further comprising a rear section for which the outer surface portions diverge with respect to the downstream direction, a center section for which the outer surface portions are cylindrical with respect to the downstream direction, and a forward section for which the outer surface portions converge with respect to the downstream direction so that said outer surface of said nozzle body changes direction at said forward section for creating a pressure gradient where said center section meets said forward section when a gas flows from said center section to said forward section in which the pressure gradient tends to hold the gas along said outer surface as it flows, and so that the gas converges at said face of said nozzle body; and said retaining member comprising means for positioning and maintaining said nozzle in a torch assembly, and means for directing a flow of cooling gases against said outer surface of said nozzle body.

9. A plasma torch assembly according to claim 8 wherein said nozzle body is substantially hollow with a mouth at said rear portion, and wherein said plasma torch assembly further comprises a torch electrode extending through said mouth and into said hollow nozzle body with the tip of said electrode positioned adjacent said nozzle face so that an appropriate plasma arc can be formed between said electrode and said nozzle or between said electrode and a conductive workpiece.

10. A plasma torch assembly according to claim 8 wherein said cooling gas flow directing means in said retaining member comprises a plurality of openings in said retaining member adjacent said nozzle body, and wherein said retaining member positions said nozzle body with said rear section diverging portions adjacent said openings so that said retaining member and said rearward portions of said nozzle body define a plenum therebetween, and in which plenum a flow of cooling gases can equilibrate as they begin to flow downstream along said nozzle body.

11. A plasma torch assembly according to claim 10 wherein said retaining member has a generally circular opening through which said nozzle body projects, and wherein said retaining member and said nozzle body define an annulus therebetween through which cooling gases can flow, and wherein said retaining member positions said nozzle body with at least said center portion and said forward portion substantially entirely outside of said retaining member so that the flow of cooling gases along the outer surface of said nozzle body takes place substantially outside of the remainder of said plasma torch assembly to thereby more efficiently cool said nozzle.

12. A plasma torch assembly according to claim 11 wherein said annulus between said retaining member and said nozzle body has a width of between about 0.005 and 0.030 inches.

13. A plasma torch assembly according to claim 8 wherein said retaining member is carried by a retaining member insulator in said plasma torch assembly.

14. A plasma arc torch comprising:

a substantially cylindrical hollow outer insulator;

an electrode body carried concentrically within said insulator;

an electrode in electrical contact with said electrode body;

a nozzle retaining member carried by portions of said outer insulator; and a nozzle carried by said retaining member and in adjacent surrounding relationship to said electrode, said nozzle comprising a substantially barrel-shaped nozzle body having a longitudinal opening therethrough for directing the flow of a gas for a plasma arc from rearward portions of said body downstream to forward portions of said body, and then out of a tip at said forward portions to form a plasma arc in the presence of a sufficient electrical potential difference;

said nozzle body further comprising a rear section for which the outer surface portions diverge with respect to the downstream direction, a center section for which the outer surface portions are cylindrical with respect to the downstream direction, and a forward section for which the outer surface portions converge with respect to the downstream direction so that said outer surface of said nozzle body changes direction at said forward section for creating a pressure gradient where said center section meets said forward section when a gas flows from said center section to said forward section in which the pressure gradient tends to hold the gas along said outer surface as it flows, and so that the gas converges at said face of said nozzle body.

15. A plasma arch torch according to claim 14 and further comprising:

a pilot arc body between said outer insulator and said electrode body; and an inner insulator between said pilot arc body and said electrode body.

16. A plasma arc torch according to claim 15 and wherein said electrode body has a longitudinal gas flow opening therethrough and wherein the interior of said electrode is substantially hollow and in fluid communication with said longitudinal gas flow opening in said electrode body so that a gas directed through said electrode body will reach the interior of said electrode and help cool said electrode during plasma arc operation.

17. A plasma arc torch according to claim 16 wherein said electrode body further comprises means for directing a fluid from the interior of said electrode to both the interior and exterior of said nozzle, so that a gas flow directed to the interior of said nozzle forms a plasma arc in the presence of a sufficient electrical potential difference, and a gas flow directed to the exterior of said nozzle helps cool said nozzle and helps divert splashback from a workpiece as the gas flow travels over said diverging and converging outer surface of said nozzle.

18. A plasma arc torch according to claim 17 wherein said fluid directing means comprises an electrode adapter carried by said electrode body, said adapter comprising a generally cylindrical body with a longitudinal opening extending entirely therethrough, said cylindrical body having a first set of radially spaced openings perpendicular to and in fluid communication with said longitudinal opening for providing fluid communication between the interior of said electrode and the exterior of said nozzle, and a second set of radially spaced openings perpendicular to and in fluid communication with said longitudinal opening for providing fluid communication between the interior of said electrode and the interior of said nozzle, wherein said adapter protects said electrode body and related portions of said torch from catastrophic failure of said electrode.

19. A plasma arc torch according to claim 17 wherein said retaining member further comprises a plurality of openings therein in fluid communication with said fluid directing means in said electrode body for directing a cooling gas flow from said electrode body to the exterior of said nozzle.

20. A plasma arc torch according to claim 14 wherein said nozzle retaining member positions said nozzle body with at least said center portion and said forward portion substantially entirely outside of said retaining member so that the flow of cooling gases along the outer surface of said nozzle body takes place substantially outside of the remainder of said plasma torch assembly to thereby more efficiently cool said nozzle.

* * * * *